United States Patent
Bonabeau et al.

(10) Patent No.: US 7,356,518 B2
(45) Date of Patent: Apr. 8, 2008

(54) METHODS AND SYSTEMS FOR MULTI-PARTICIPANT INTERACTIVE EVOLUTIONARY COMPUTING

(75) Inventors: Eric Bonabeau, Winchester, MA (US); Pablo Funes, Somerville, MA (US)

(73) Assignee: Icosystem Corporation, Cambridge, MA (US)

( * ) Notice: Subject to any disclaimer, the term of this patent is extended or adjusted under 35 U.S.C. 154(b) by 291 days.

(21) Appl. No.: 10/922,777

(22) Filed: Aug. 20, 2004

(65) Prior Publication Data

US 2005/0119983 A1    Jun. 2, 2005

Related U.S. Application Data

(60) Provisional application No. 60/539,230, filed on Jan. 26, 2004, provisional application No. 60/498,189, filed on Aug. 27, 2003.

(51) Int. Cl.
*G06F 15/18* (2006.01)
*G06N 3/00* (2006.01)
*G06N 3/12* (2006.01)

(52) U.S. Cl. .................................................. 706/13
(58) Field of Classification Search ............... 706/13
See application file for complete search history.

(56) References Cited

U.S. PATENT DOCUMENTS

| | | | |
|---|---|---|---|
| 4,796,194 A | | 1/1989 | Atherton |
| 5,136,686 A | | 8/1992 | Koza |
| 5,195,172 A | * | 3/1993 | Elad et al. .................... 706/62 |
| 5,233,513 A | | 8/1993 | Doyle |
| 5,428,712 A | * | 6/1995 | Elad et al. .................... 706/46 |
| 5,465,221 A | * | 11/1995 | Merat et al. .................. 702/83 |
| 5,568,590 A | | 10/1996 | Tolson |
| 5,581,657 A | | 12/1996 | Lyon |
| 5,617,510 A | * | 4/1997 | Keyrouz et al. .............. 706/45 |
| 5,708,774 A | | 1/1998 | Boden |
| 5,737,581 A | | 4/1998 | Keane |
| 5,761,381 A | | 6/1998 | Arci et al. |

(Continued)

FOREIGN PATENT DOCUMENTS

EP    1235180    8/2002

(Continued)

OTHER PUBLICATIONS

Designing collective behavior in a group of humans using a real-time polling system and interactive evolution Buchsbaum, D.; Funes, P.; Budynek, J.; Koppermann, H.; Bonabeau, E; Swarm Intelligence Symposium, 2005. SIS 2005. Proceedings 2005 IEEE Jun. 8-10, 2005 pp. 15-21.*

(Continued)

*Primary Examiner*—Michael B. Holmes
(74) *Attorney, Agent, or Firm*—Foley Hoag LLP

(57) ABSTRACT

Disclosed are methods, systems, and processor program products that include executing an optimization scheme to obtain a first solution set, presenting the first solution set to at least two users, receiving rankings of the first solution set from the at least two users, aggregating the rankings, and, generating a second solution set based on the aggregated rankings. The optimization scheme can include a genetic algorithm. In embodiments, at least a part of the first solution set can be presented to the users based on the parts of the solution set associated with the user (e.g., user's knowledge).

16 Claims, 10 Drawing Sheets

U.S. PATENT DOCUMENTS

| | | | |
|---|---|---|---|
| 5,761,494 A * | 6/1998 | Smedley et al. ............... | 707/4 |
| 5,793,931 A | 8/1998 | Hillis | |
| 5,809,489 A | 9/1998 | Davidor et al. | |
| 5,858,462 A | 1/1999 | Yamazaki | |
| 5,864,633 A | 1/1999 | Opsal et al. | |
| 5,867,397 A | 2/1999 | Koza et al. | |
| 5,890,133 A | 3/1999 | Ernst et al. | |
| 5,890,146 A * | 3/1999 | Wavish et al. ............... | 706/46 |
| 5,897,629 A | 4/1999 | Shinagawa et al. | |
| 5,930,780 A | 7/1999 | Hughes et al. | |
| 5,963,447 A * | 10/1999 | Kohn et al. .................. | 700/49 |
| 5,963,939 A * | 10/1999 | McCann et al. ............. | 707/4 |
| 5,970,487 A | 10/1999 | Shackleford et al. | |
| 5,987,457 A | 11/1999 | Ballard | |
| 6,029,139 A | 2/2000 | Cunningham et al. | |
| 6,055,523 A | 4/2000 | Hillis | |
| 6,098,059 A | 8/2000 | Nordin | |
| 6,125,351 A | 9/2000 | Kauffman | |
| 6,253,200 B1 * | 6/2001 | Smedley et al. ............... | 707/4 |
| 6,321,205 B1 | 11/2001 | Eder | |
| 6,327,582 B1 | 12/2001 | Worzel | |
| 6,336,110 B1 * | 1/2002 | Tamura et al. ............... | 706/46 |
| 6,408,263 B1 | 6/2002 | Summers | |
| 6,411,373 B1 * | 6/2002 | Garside et al. .............. | 356/39 |
| 6,424,358 B1 * | 7/2002 | DiDomizio et al. ........ | 715/762 |
| 6,430,545 B1 * | 8/2002 | Honarvar et al. ............ | 706/47 |
| 6,434,435 B1 | 8/2002 | Tubel et al. | |
| 6,434,542 B1 | 8/2002 | Farmen et al. | |
| 6,449,761 B1 * | 9/2002 | Greidinger et al. ........... | 716/11 |
| 6,480,832 B2 | 11/2002 | Nakisa et al. | |
| 6,513,024 B1 | 1/2003 | Li | |
| 6,523,016 B1 | 2/2003 | Michalski | |
| 6,571,282 B1 * | 5/2003 | Bowman-Amuah ........ | 709/219 |
| 6,576,919 B1 | 6/2003 | Yoshida et al. | |
| 6,745,184 B1 * | 6/2004 | Choi et al. .................... | 707/6 |
| 6,763,354 B2 * | 7/2004 | Hosken ......................... | 707/6 |
| 6,848,104 B1 * | 1/2005 | Van Ee et al. .............. | 719/310 |
| 6,895,405 B1 * | 5/2005 | Choi et al. .................. | 707/101 |
| 6,912,587 B1 | 6/2005 | O'Neil | |
| 6,928,434 B1 * | 8/2005 | Choi et al. .................... | 707/6 |
| 6,934,405 B1 | 8/2005 | Schuessler | |
| 6,950,712 B2 | 9/2005 | Ulyanov et al. | |
| 6,952,700 B2 * | 10/2005 | Modha et al. ............. | 707/101 |
| 6,957,200 B2 | 10/2005 | Buczak et al. | |
| 6,996,560 B1 * | 2/2006 | Choi et al. .................... | 707/6 |
| 7,003,504 B1 * | 2/2006 | Angus et al. .................. | 707/1 |
| 7,007,006 B2 * | 2/2006 | Zilio et al. .................... | 706/47 |
| 7,035,740 B2 * | 4/2006 | Kermani ....................... | 702/19 |
| 7,076,475 B2 * | 7/2006 | Honarvar ..................... | 706/47 |
| 7,117,202 B1 * | 10/2006 | Willoughby .................. | 707/3 |
| 7,127,695 B2 * | 10/2006 | Huang et al. ................ | 716/10 |
| 7,191,164 B2 * | 3/2007 | Ray et al. ..................... | 706/52 |
| 7,280,986 B2 * | 10/2007 | Goldberg et al. ............ | 706/13 |
| 2001/0003824 A1 | 6/2001 | Schnier | |
| 2002/0156773 A1 | 10/2002 | Hildebrand et al. | |
| 2003/0055614 A1 | 3/2003 | Pelikan et al. ................ | 703/2 |
| 2003/0088458 A1 | 5/2003 | Afeyan et al. | |
| 2004/0133355 A1 | 7/2004 | Schneider .................... | 702/19 |
| 2004/0204957 A1 | 10/2004 | Afeyan et al. | |

FOREIGN PATENT DOCUMENTS

| | | |
|---|---|---|
| WO | WO-0002136 | 1/2000 |
| WO | WO-002138 | 1/2000 |
| WO | WO-0054185 | 9/2000 |
| WO | WO-0227541 | 4/2002 |

OTHER PUBLICATIONS

Resource allocatioin for a distributed sensor network Martin, M.C.; Trifonov, I.; Bonabeau, E.; Gaudiano, P.; Swarm Intelligence Symposium, 2005. SIS 2005. Proceedings 2005 IEEE Jun. 8-10, 2005 pp. 428-431.*

Evolving behaviors for a swarm of unmanned air vehicles Gaudiano, P.; Bonabeau, E.; Shargel, B.; Swarm Intelligence Symposium, 2005. SIS 2005. Proceedings 2005 IEEE Jun. 8-10, 2005 pp. 317-324.*

Modeling, quantifying and testing complex aggregate service chains Anderson, C.; Rothermich, J.A.; Bonabeau, E.; Web Services, 2005. ICWS 2005. Proceedings. 2005 IEEE International Conference on Jul. 11-15, 2005 pp. 274-281 vol. 1.*

Interactive multi-participant tour allication Funes, P.; Bonabeau, E.;Herve, J.; Morieux, Y.; Evolutionary Computation, 2004. CEC2004. Congress on vol. 2, Jun. 19-23, 2004 pp. 1699-1705 vol. 2.*

Interactive exploratory data analysis Malinchik, S.; Orme, B.; Rothermich, J.A.; Bonabeau, E.; Evolutionary Computation, 2004. CEC2004. Congress on vol. 1, Jun. 19-23, 2004 pp. 1098-1104 vol. 1.*

Evolutionary testing as both a testing and redesign tool: a study of a shipboard firemain's valve and pump controls Anderson, C.; Bonabeau, E.; Scott, J.M.; Evolutionary Computation, 2004. CEC2004. Congress on vol. 1, Jun. 19-23, 2004 pp. 1089-1097 vol. 1.*

Interactive inversion of financial markets agent-based models Ashburn, T.; Bonabeau, E.; Evolutionary Computation, 2004. CEC2004. Congress on vol. 1, Jun. 19-23, 2004 pp. 522-529 vol. 1.*

Coevolutionary robotics Pollack, J.; Lipson, H.; Funes, P.; Ficici, S.; Hornby, G.; Evolvable Hardware, 1999. Proceedings of the First NASA/DoD Workshop on Jul. 19-21, 1999 pp. 208-216.*

Assessing the convergence of rank-based multiobjective genetic algorithms Kumar, R.; Rockett, P.; Genetic Algorithms In Engineering Systems:Innovations And Applications, 1997. GALESIA 97. Second International Conference On (Conf. Publ. No. 446) Sep. 2-4, 1997 pp. 19-23.*

Nevanlinna-Pick interpolation with degree constraint: complete parameterization based on Lyapunov inequalities van der Meche, E.; Bosgra, O.; Decision and Control, 2004. CDC. 43rd IEEE Conference on vol. 1, Dec. 14-17, 2004 pp. 411-416 vol. 1.*

Processor-efficient parallel solution of linear systems. II. The positive characteristic and singular cases Kaitofen, E.; Pan, V.; Foundations of Computer Science, 1992. Proceedings., 33rd Annual Symposium on Oct. 24-27, 1992 pp. 714-723.*

A geometrical approach to the maximal corank problem in the analysis of linear relations De Moor, B.; Vandewalle, J.; Decision and Control, 1986 25th IEEE Conference on vol. 25, Part 1, Dec. 1986 pp. 1990-1995.*

A distributed genetic algorithm for multivariable fuzzy control Linkens, D.A.; Okola Nyongesa, H.; Genetic Algorithms for Control Systems Engineering, IEE Colloquium on May 28, 1993 pp. 9/1-9/3.*

An interactive fuzzy satisficing method for multiobjective nonconvex programming problems with fuzzy numbers through coevolutinary genetic algorithms Sakawa, M.; Yauchi.; Systems, Man and Cybernetics, Part B, IEEE Transactions on vol. 31, Issue 3, Jun. 2001 pp. 459-467 Digital Object Identifier 10.1109/3477.931546.*

Multiobjective Optimization Scheduling Based on Fuzzy Genetic Algorithm in Cascaded Hydroelectric Stations Hu Guoqiang; He Renmu; Ma Rui; Wang Peng; Yang Huachun; Transmission and Distribution Conference and Exibition: Asia and Pacific, 2005 IEEE/PES 2005 pp. 1-4 Digital Object Indentifier 10.1109/TDC.2005.1547075.*

A Multiobjective Memetic Algorithm Based on Particle Swarm Optimization Dasheng Liu; Tan, K.C.; Goh, C.K.; Ho, W.K.; Systems, Man and Cybernetics, Part B, IEEE Transactions on vol. 37, Issue 1, Feb. 2007 pp. 42-50 Digital Object Identifier 10.1109/TSMCB.2006.883270.*

Multi-objective genetic programming for nonlinear system identification Rodriguez-Vazquez, K.; Fleming, P.J.; Electronics Letters vol. 34, Issue 9, Apr. 30, 1998 pp. 930-931.*

A Multi-objective Genetic Programming/ NARMAX Approach to Chaotic Systems Identification Pu Han; Shiliang Zhou; Dongfeng Wang; Intelligent Control and Automation, 2006. WCICA 2006. The Sixth World Congress on vol. 1, 2006 pp. 1735-1739 Digital Object Identifier 10.1109/WCICA.2006.1712650.*

Enhanced distribution and exploration for multiobjective evolutionary algorithms Tan, K.C.; Yang, Y.J.; Goh, C.K.; Lee, T.H.; Evolutionary Computation, 2003. CEC '03. The 2003 Congress on vol. 4, Dec. 8-12, 2003 pp. 2521-2528 vol. 4 Digital Object Identifier 10.1109/CEC.2003.1299405.*

Constrained circuit optimization via library table genetic algorithms MacEachern, L.A.; Circuits and Systems, 1999. ISCAS '99. Proceedings of the 1999 IEEE International Symposium on vol. 6, May 30-Jun. 2, 1999 pp. 310-313 vol. 6 Digital Object Identifier 10.1109/ISCAS.1999.780157.*

Assessing the convergence of rank-based multiobjective genetic algorithms Kumar, R.; Rockett, P.; Genetic Algorithms In Engineering Systems:Innovations And Applications, 1997. GALESIA 97. Second International Conference On (Conf. Publ. No. 446) Sep. 2-4, 1997 pp. 19-23.*

Electric distribution network multiobjective design using a problem-specific genetic algorithm Carrano, E.G.; Soares, L.A.E.; Takahashi, R.H.C.; Saldanha, R.R.; Neto, O.M.; Power Delivery, IEEE Transactions on vol. 21, Issue 2, Apr. 2006 pp. 995-1005 Digital Object Identifier 10.1109/TPWRD.2005.858779.*

Multiobjective optimal design of interior permanent magnet synchronous motors considering improved core loss formula Dong-Hyeok Cho; Hyun-Kyo Jung; Dong-Joon Sim: Energy Conversion, IEEE Tarnsactions on vol. 14, Issue 4, Dec. 1999 pp. 1347-1352 Digital Object Identifier 10.1109/60.815071.*

Concurrent Optimization for Parameters of Powertrain and Control System of Hybrid Electric Vehicle Based on Multi-Objective Genetic Algorithms Li-Cun Fang; Shi-Yin Qin; SICE-ICASE, 2006. International Joint Conference Oct. 2006 pp. 2424-2429 Digital Object Identifier 10.1109/SICE.2006.315114.*

Large scale fuzzy multiobjective 0-1 programs through genetic algorithms with decomposition procedures Kato, K.; Sakawa, M.; Knowledge-Based Intelligent Electronics Systems, 1998. Proceedings KES '98. 1998 Second International Conference on vol. 1, Apr. 21-23, 1998 pp. 278-284 vol. 1 Digital Object Identifier 10.11209/KES.1998.725859.*

Design space exploration using the genetic algorithm Esbensen, H.; Kuh, E.S.; Circuits and Systems, 1996. ISCAS '96., 'Connecting the World'., 1996 IEEE International Symposium on vol. 4, May 12-15, 1996 pp. 500-503 vol.4 Digital Object Identifier 10.1109/ISCAS.1996.542010.*

Genetic algorithms in noisy environement Then, T.W.; Chong, E.K.P.; Intelligent Control, 1994., Proceedings of the 1994 IEEE International Symposium on Aug. 16-18, 1994 pp. 225-230 Digital Object Identifier 10.1109/ISIC. 1994.367813.*

An intergrated methodology for multobjective optimal component placement and heat sink sizingGopinath, D.; Joshi, Y.; Azarm, S.;Components and Packaging Technologies, IEEE Transactions on [see also Components, Packaging and Manufacturing Technology, Part A: Packaging Technologies, IEEE Tranactions on] vol. 28, Issue 4, Dec. 2005 p. 869.*

Application of vector optimization employing modified genetic algorithm to permanent magnet motor design Dong-Joon Sim; Hyun-Kyo Jung; Song-Yop Hahn; Jong-Soo Won; Magnetics, IEEE Transactions on vol. 33, Issue 2, Part 2, Mar. 1997 pp. 1888-1891 Digital Object Identifier 10.1109/20.582654.*

Comparison between Single-Objective and Multi-Objective Genetic Algorithm: Performance Comparison and Performance Measures Ishibuchi, H.; Nojima, Y.; Tsutomu Doi; Evolutionary Computation, 2006. CEC 2006. IEEE Congress on Jul. 16-21, 2006 pp. 1143-1150.*

GA-based multi-objective optimization Li Mingquiang; Kou Jisong; Dai Lin; Intelligent Control and Automation, 2000. Proceedings of the 3rd World Congress on vol. 1, Jun. 28-Jul. 2, 2000 pp. 637-640 vol. 1 Digital Object Identifier 10.1109/WCICA.2000.860050.*

Using Semantic Graphs in Clustering Process : Enhance Information Level Brunner, B.; Berrien, I.; Web Intelligence, 2004. WI 2004. Proceeding. IEEE/WIC/ACM International Conference on Sep. 20-24, 2004 pp. 221-227 Digital Object Identifier 10.1109/WI.2004.10106.*

Multiobjective genetic optimization of diagnostic classifiers with implications for generating reciever operating characteristic curves Kupinski, M.A.; Anastasio, M.A.; Medical Imaging, IEEE Transactions on vol. 18, Issue 8, Aug. 1999 pp. 675-685 Digital Object Identifier 10.1109/42.796281.*

Robust optimal power control for ad hoc networks Fridman, A.; Grote, R.; Weber, S.; Dandekar, K.R.; Kam, M.; Information Sciences and Systems, 2006 40th Annual Conference on Mar. 22-24, 2006 pp. 729-733 Digital Object identifier 10.1109/CISS.2006.286562.*

Bäck, Thomas, et al., "Handbook of Evolutionary Computation," 1997, Publishing Ltd. and Oxford University Press, p. 14, lines 15-16. (*A1.3 Advantages (and disadvantages) of evolutionary computation over other approaches*.

Baeza-yates R., et al: "Modern Information Retrieval, Chapter 5: Query Operations" Modern Modern Information Retrievel, Harlow: Addison-Wesley, GB, 1999, pp. 117-139, XP002311981, ISBN: 0-201-39829-X.

Banks, Jerry, "Discrete-Event System Simulation," Second Edition, 1996, Prentice-Hall, Upper Saddle River, New Jersey, pp. 3 - 55, 1 *Introduction to Simulation*.

Banks, Jerry, "Handbook of Simulation: Principles, Methodology, Advances, Applications, and Practice," 1998, John Wiley & Sons, Inc., New York, New York. p. 15, line 15-22, 1.7 *Steps in a Simulation Study*.

Banzhaf, Wolfgang, et al., "Genetic Programming: An Introduction On the Automatic Evolution of Computer Programs and its Applications," 1998, Morgan Kaufmann Publishers, Inc., San Francisco, California, p. 14, 1 *Genetic Programming as Machine Learning*.

Beasley D, et al.: "An Introduction to Genetic Algorithms", Vivek, National Centre for Software Technology, Bombay, In, vol. 7, No. 1, pp. 3-19, XPoo1061908, ISSN: 0970-8618.

Cortinas, Marty; "HPS to remodel Ithink simulator." (High Performance Systems Inc's Ithink 5.0 business-modeling, simulation software) (Product Announcement). MacWEEK, v11, n26, p.29(2), Jul. 7, 1997.

Ferber, Jacques, "Multi-Agent Systems: An Introduction to Distributed Artificial Intelligence," 1999, Addison Wesley Longman Limited, Harlow, Essex, England, p. 1 - 48, 1 *Principles of Multi-Agent Systems*.

Michaelewicz, Zbigniew, "Genetic Algorithms + Data Structures = Evolution Programs," Third, Revised and Extended Edition, 1996, Springer-Verlag Berlin Heidlberg, p. 13 - 31, GAs: *What Are They?*.

Micro Saint 3.2 (278548); Micro Analysis & Design Inc., 4900 Pearl East Cir. #201E, Boulder, CO 80301, Jan. 1986.

Moss, Scott, et al., "Lecture Notes in Artificial Intelligence: Subseries of Lecture Notes in Computer Science: Multi-Agent-Based Simulation," Second International Workshop, MABS 2000, Boston Massachusetts, Jul., Revised and Additional Papers, Springer-Verlag Berlin Heidelberg, pp. 1 - 26, *Editorial Introduction: Messy Systems - The Target for Multi Agent Based Simulation*.

Srinivas, M., et al.: "Genetic Algorithms: A Survey" Computer, IEEE Service Center, Los Alamitos, CA, US, vol. 27, No. 6, Jun. 1, 1994 (Jun. 1, 1994), pp. 17-26, XP000438318, ISSN: 0018-9162.

Valenzuela, Christine L., "A Simple Evolutionary Algorithm for Multi-objective Optimization (SEAMO)," Evolutionary Computation, 2002, 1:717-722 (2002).

Van Veldhuizen, David A., "Issues in Parallelizing Multiobjective Evolutionary Algorithms for Real World Applications," Proceedings of the 17th Symposium on Proceedings of the 2002 ACM Symposium on applied computing, Mar. 2002, pp. 595-602.

Zeigler, Bernard P., et al., "Theory of Modeling Simulation, Second Edition, Integrating Discrete Event and Continuous Complex Dynamic Systems," 2000 Academic Press, San Diego, California, pp. 3-53, 1 *Introduction to Systems Modeling Concepts*.

Wang, Jihua et al., "An Optimization-Based Algorithm for Job Shop Scheduling," University of Connecticut, Dept. of Electrical Engineering Publishing, MSL Papers, Mar. 28, 2004 (Mar. 28, 2004). p. 10.

International Search Report and written Opinion for PCT/US 06/36765.

Ronald, S., "Duplicate genotypes in a genetic algorithm," Evolutionary Computation Proceedings, 1998. IEEE World Congress on Computational Intelligence., The 1998 IEEE International Conference on May 4-9, 1998 pp. 793-798, Digital Object Identifier 1.1109/ICEC.1998.700153.

Cranfield, et al., "Exposure of magnetic bacteria to simulated mobile phone-type RF radiation has no impact on mortality," Nanobioscience, IEEE Transactions on vol. 2, Issue Sep. 3, 2003 pp. 146-149, Digital Object Identifier 10.1009/TNB.2003.816227.

* cited by examiner

METHODS AND SYSTEMS FOR MULTI-PARTICIPANT INTERACTIVE EVOLUTIONARY COMPUTING

CLAIM OF PRIORITY

This application claims priority to U.S. Ser. No. 60/498,189 filed on Aug. 27, 2003, and this application also claims priority to U.S. Ser. No. 60/539,230 filed Jan. 26, 2004, the entire contents of both of which are herein incorporated by reference in their entirety.

CROSS-REFERENCE TO RELATED APPLICATIONS

This patent application is co-pending with a related patent application U.S. Ser. No. 10/815,321, filed Apr. 1, 2004, and also, U.S. Ser. No. 10/903,621, filed on Jul. 30, 2004, the contents of both of which are incorporated herein by reference in their entirety.

BACKGROUND (1) Field

The disclosed methods and systems relate generally to evolutionary computing, and more particularly to interactive evolutionary computing.

(2) Description of Relevant Art

Evolutionary algorithms can generally be understood to include stochastic search methods that replicate natural biological evolution. Often, these evolutionary algorithms operate on a population of potential solutions by applying a "survival of the fittest" principle to produce approximations to a solution. A new solution set of approximations is thus created at each generation by selecting individuals according to their level of fitness in the problem domain, and breeding these selected individuals using operators emulating natural genetics. The process facilitates an evolution of populations of "individuals" that are better suited to their environment than the individuals that they were created from, just as in natural adaptation.

Evolutionary algorithms can thus model natural processes including selection, recombination, mutation, migration, locality, and neighborhood. Evolutionary algorithms are generally performed in a parallel manner, using for example, a migration, global, or diffusion model, to operate on populations of individuals rather than single solutions/individuals. Accordingly, a solution set of individuals (e.g., population) can be randomly initialized, and an objective function can be evaluated for these individuals. If optimization criteria are not met, a new generation is created where individuals are selected according to their fitness for the production of offspring. Parents can be recombined to produce offspring, and offspring can be mutated with a certain probability. The fitness of the offspring is then computed, and the offspring replace the parents in the population to provide a new generation. This cycle is performed until the optimization criteria are reached.

In some applications, evaluation of the fitness and/or objective function(s) may be subjectively influenced by an expert (or experts) in the given problem domain(s) under a given number of constraints. The fitness can be represented mathematically, visually or through another form of evaluation. The fitness and/or objective function(s) can be defined such that evolved designs perform certain tasks subject to given constraints.

Many real-world optimization problems are assignment problems whereby resources are assigned a set of tasks to perform. In such problems, the objective function, or the quantity or vector one seeks to maximize or minimize, can be productivity, speed, robustness, etc. The optimization can be further subjected to hard or soft constraints. If the resources are human beings, there are un-verbalized and/or un-formulated and/or subjective criteria and constraints such as implicit knowledge and preferences specific to each of those human beings that are not considered by the objective function. For example, in a factory scheduling application where workers are assigned jobs to reduce production time under such constraints as changeover times or compatibility, some workers may have special knowledge about the factory and/or may prefer to work on certain machines they like or know better. Such factors are not considered in the objective function, but may be crucial to worker efficiency, worker satisfaction, and overall productivity.

In another example, mailmen are assigned tours. Management's objective function is to reduce the amount of time to deliver mail to increase speed of service. Constraints may include load balancing (e.g., mailmen should have approximately the same distance and the same load to carry) and/or maximum weight a mailman can carry; however, certain mailmen may subjectively prefer certain tours because they know the terrain well and/or because the tours end close to where they live, etc. There is also implicit knowledge a mailman has about certain tours, e.g., when building caretakers are present. Generally, existing methods and systems fail to consider un-verbalized and/or un-formulated and/or subjective criteria and constraints specific to human participants in the system.

SUMMARY

Disclosed are methods, systems, and processor program products that include executing an optimization scheme to obtain a first solution set, presenting the first solution set to two or more users, receiving rankings of the first solution set from the two or more users, aggregating the rankings, and, generating a second solution set based on the aggregated rankings. The optimization scheme can include a genetic algorithm. The optimization scheme can be terminated using at least one termination criterion that can include a number of iterations and/or a degree of fitness.

The methods and systems can include generating the second solution set using a second optimization scheme, which can be a genetic algorithm, a single generation genetic algorithm, and/or a multiple generation genetic algorithm. The methods and systems can also include presenting the second solution set to at least one user, obtaining a ranking of the second solution set from the user(s), and generating a third solution set based on the ranking(s) of the second solution set. The user(s) can be different from the aforementioned two or more users, and/or at least partly the same aforementioned two or more users.

The methods and systems can thus also include aggregating at least two rankings of the second solution set. In some embodiments, presenting the first solution set includes determining, for each user, at least a part of the first solution set associated with each user, and, presenting to each user the at least a part of the first solution set associated with each user. In determining at least a part of the first solution set associated with each user, the methods and systems can include determining based on a knowledge of and/or an involvement and/or experience level of each user. The solution sets can be presented in parallel and in series, and/or synchronously and/or asynchronously.

In embodiments, the rankings can be received within a time period. Further, the methods and systems can include determining that a time period expired, and, assigning rankings based on a prior ranking received from a user. Such assigned rankings further be a default ranking.

In aggregating the rankings, the methods and systems may aggregate aggregating based on a weighting assigned to the at least two users. Such weighting may be based on a user's knowledge, experience, etc.

The methods and systems also allow for adjusting at least some of the first solution set prior to presenting the first solution set to the two or more users.

In an embodiment, the methods and systems include determining whether at least one exit criterion is satisfied before iteratively returning to executing an optimization scheme. Also included is an adjusting of at least a part of the optimization scheme before iteratively returning to executing an optimization scheme. For example, the optimization scheme can be adjusted by modifying parameters of the optimization scheme, such as modifying parameters of a genetic algorithm.

Other objects and advantages of the disclosed methods and systems will become apparent in view of the disclosed illustrative embodiments.

BRIEF DESCRIPTION OF THE DRAWINGS

FIG. 6A shows an average and best fitness during an optimization execution for an optimization heuristic executed for T=100 iterations, and six best solutions;

DESCRIPTION

Figure 1B:
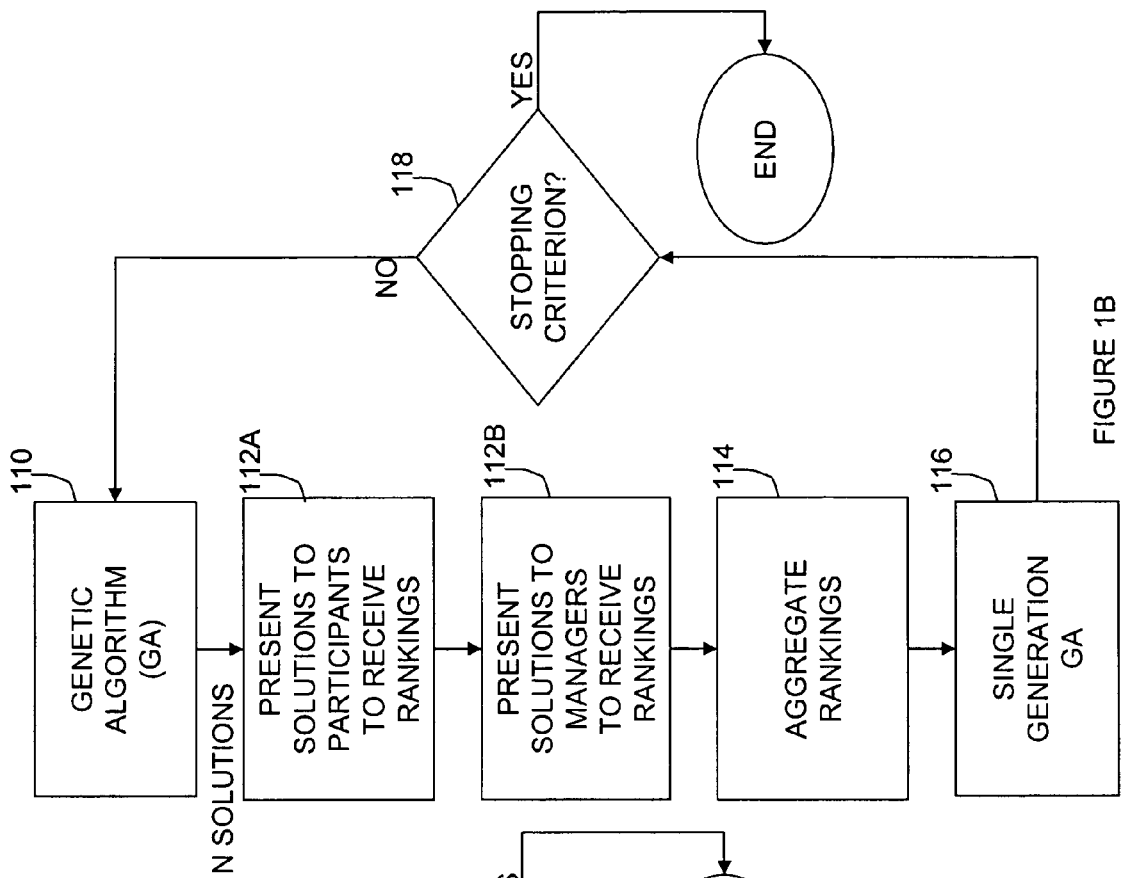
FIGS. 1A-1C show some embodiments of the disclosed methods and systems.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

The disclosed methods and systems employ interactive evolution (IE) for guiding the search for solutions in multi-participant assignment problems where more than one participant, and in some embodiments, each participant, can be associated with an individualized set of un-verbalized and/or un-formulated and/or subjective criteria and constraints that can be used with a formalized objective function. Although the disclosed methods and systems envision human participants with subjective information, the disclosed methods and systems may also be applicable to receiving input from intelligent machines (e.g., processor-controlled devices). Accordingly, the use of the phrase "participant" can be understood to generally include users of the disclosed methods and systems, where such users thus may be human and/or non-human, and in some embodiments, where such users may be further categorized and/or grouped into two more groupings that may be associated with other labels (participants, workers, managers, etc.). The use of the phrase "participants" can thus be understood to include all such users, and the labels and/or groupings of such participants/users as described herein are merely for illustration and not limitation.

The use of IE in search and optimization problems where a fitness function is not easily evaluated by a computer and/or can not be described without subjectivity is described in co-pending patent application U.S. Ser. No. 10/815,321, filed Apr. 1, 2004, incorporated by reference in its entirety. In the disclosed methods and systems, the use of IE includes a multiplicity of participants who are provided with a portion of the solution, where such portion is associated with the solution in which a given participant is involved. The participants' input can be provided in a variety of manners, including selection via a computer mouse, joystick, keyboard, touch-pad, stylus, voice and/or audio command, and other available means for providing an input to a processor-controlled device.

Optimization is commonly understood in the art as the process of identifying solutions to a problem to minimize or maximize certain criteria known as the objective function. More specifically the optimization process aims to discover solutions that satisfy to a certain degree all present constraints while optimizing at least one implicit or explicit objective. The disclosed methods and systems apply IE to the search for solutions in multi-participant assignment problems where at least some if not all participants has their own set of un-verbalized and/or un-formulated and/or subjective criteria and constraints in addition to a formalized objective function. In embodiments, participants can be presented with and only evaluate the portions of solutions that are relevant to those participants.

An Evolutionary Algorithm (EA) can be understood to be a stochastic search method that can be applied to a population of solutions. EA can generally include three factors that include: a population of solutions (which may be randomly initialized), a mutation operator capable of changing at least one of the solutions to a neighboring solution (e.g., a local search operator), and a recombination operator which can recombine a genotype of two parents into a child solution inheriting traits from both parents (e.g., a global search operator). Recombination can include reproduction, mutation, and/or crossover, where crossover can be understood to be the combination of two individuals (the "parents") to produce two more individuals (the "children"). Those of ordinary skill will recognize that crossover can include asexual crossover and/or single-child crossover. Accordingly, crossover acts to relay genetic material from the previous generation to the subsequent generation. Mutation introduces randomness to the process. The variations of EA are thus well known in the art, and the disclosed methods and systems are not limited by such implementations and/or variations of embodiments.

Although in some EA applications a solution can be obtained by comparing individual solutions to a pre-determined objective and/or fitness function, in the disclosed embodiments the objective and/or fitness function may not be a single function. Rather, the fitness function can be defined by the priorities given to the objectives, where the prioritization of objectives may be the unknown. Further, as provided herein, selection of a solution may not based solely on comparison with a fixed objective function, but rather a solution can be based on subjective participant-evaluation of the portion of solution in which the participant is involved. The disclosed methods and systems thus allow for a collective evaluation of the solutions by potentially all the participants, rather than an automated evaluation of solutions with respect to a static and explicit objective function.

Disclosed herein are systems and methods to generate solutions to a multi-participant assignment-type optimization problem by considering an objective function, constraints, and criteria, and a multiplicity of subjective criteria associated with participants in the solution. The disclosed methods and systems relate to using IE to guide the search for solutions in multi-participant assignment problems where participants have a corresponding individualized set of un-verbalized and/or un-formulated and/or subjective criteria and constraints that can be used with a formalized objective function. Applications include, but are not restricted to, crew scheduling, factory scheduling, multi-routing, service fleet planning and scheduling, task allocation, planning and scheduling in the retail, service, and/or manufacturing industries. The methods and systems can use implicit knowledge that resides with workers and employees.

The disclosed methods and systems employ evolutionary schemes to facilitate the search for solutions in multi-participant assignment problems where, in one embodiment, each (or at least some) participant has an individualized set of un-verbalized and/or un-formulated and/or subjective criteria and constraints that complement a formalized objective function. The evolved solution can thus can incorporate the implicit knowledge and subjective preferences, and satisfy the implicit constraints of these different participants, while incorporating an explicit objective function and objective constraining criteria, meanwhile alleviating the human energy required to validate the solution before evaluation. A manager of an assignment system can also use the same method to guide the search toward areas of solution space that appear to be more consistent with formal and/or informal objectives.

In one embodiment, several solutions can be generated using a standard, constrained or unconstrained, multi-criterion optimization method such as gradient descent, local search, simulated annealing, genetic algorithm, or another relevant optimization method. In some embodiments, several parallel or sequential representations of the solutions can be visually presented to different participants and/or each participant simultaneously and/or asynchronously. Only the portion of a given solution that involves a given participant may be presented to that participant. In other words, each participant may be presented with several parallel and/or sequential representations of the portions of solutions in which the participant/individual participates.

For example; if there m solutions generated at each generation and n individual participants, let $S_{ij}$ be the portion of the $i^{th}$ solution that involves participant j. Within a given generation, participant j can be presented with m portions of solutions, $S_{ij}$, with i=1 to m. As provided herein, the m portions of solutions can be presented sequentially or in parallel.

In such an embodiment, each participant can evaluate the portions of solutions presented to the participant/individual, which can also be applicable to the participant based on the embodiment. Interactive Evolutionary Computation (IEC) allows a broadening of the search space of possible solutions by application of the participants' subjective criteria, implicit knowledge and preferences to evaluate the portions of solutions they are presented. Participants assign fitness values to the various portions of solutions presented to them.

In some embodiments, fitness solutions having the "highest" or "greatest" degree of fitness can be identified and selected to make a new generation of offspring solutions, borrowing from the multiplicity of high fitness portions of solutions from the participants who opted to assign fitness values in an allotted time frame. The allotted timeframe may vary amongst different participants and/or be synchronized and/or asynchronized amongst participants. In one embodiment, fitness can be aggregated using an addition of fitness values from the individual participants to produce an aggregate fitness for each of the solutions, although it can be understood that other types of aggregation can be employed without departing from the scope of the disclosed methods and systems.

The new generation of solutions is created using an evolutionary algorithm. Genetic operators based on a selected configuration or other criteria (e.g. random recombination) allow parallel solutions to be generated based on the participants' input from the interactive process.

In an embodiment where the assignment of fitness values can be asynchronous, solutions can be presented on a computer screen and/or transmitted by email to participants for evaluation. Those participants who did not assign fitness values to the portions of solutions presented to them during an allotted time may not influence the next generation, and/or the evolutionary algorithm may make use of fitness values such participants assigned in earlier generations, and/or if fitness values are not received from a participant/user, rankings/fitness values may be assigned using a (set of) default value(s). A new generation of solutions is then presented to the participants ("first party"), etc., in an iterative process.

The new generation of solutions may also be presented to a manager, supervisor, and/or another (referred to herein collectively as "the manager", e.g., "second party), for example, between successive generations of participant evaluation and/or at other times that may be determined by the manager. Unlike some participants that may view only portions of solutions relevant to the participants, the manager can be presented with the entire solution(s). As provided herein, several parallel and/or sequential representations of the full solutions can be presented to the manager who may then assign fitness values to the solutions. An evolutionary algorithm can be used to create a new generation of solutions based on the fitness values assigned by the manager. This additional input from the manager enables the manager to express the manager's implicit knowledge and other subjective and/or un-formulated and/or un-verbalized criteria and constraints in the search for a solution. The expertise of the manager can also be incorporated into the significance of objectives used in the evaluation via the direct intervention of the manager in selecting the relative and/or absolute priorities assigned to chosen objective functions or criteria. In some embodiments, several managers can provide input individually, where the manager fitness can be aggregated in the same manner as the aggregation of participant fitness, although the disclosed methods and systems contemplate that embodiments may use different aggregation techniques for the managers and the participants.

The number of generations can be dependent on an objective and/or fitness function(s) established by, for example, an expert or another who is not a manager or a participant, and/or the iterative process may end when a stopping criterion is satisfied.

For example, in a factory scheduling problem, factory workers can be presented with several parallel representations of a schedule of jobs and machines which have been assigned to the workers based on potential solutions, to allow the pick, and/or assign fitness values to, the schedule (s) the worker prefers. Inputs/selections from the various workers are then aggregated and the EA can create a new generation of schedules. The new generation of schedules can then be further optimized using a formal objective function and constraints and/or it can be evaluated by one or several managers or factory planners using IE. The resulting solutions are then again evaluated by the workers, etc., until a satisfactory solution has been reached. A satisfactory solution is one that satisfies management criteria and constraints as well as an overall satisfaction level among workers.

For example, in a mailman tour problem (where a solution is a set of tours with mailmen assigned to them, with each tour formed of segments), each mailman can be presented with several parallel representations of the tours which have been assigned to the mailman in the potential solutions and the various mailmen will pick, and/or assign fitness values to, the tour[s] the mailman prefers. Inputs/selections from the various mailmen are then aggregated and EA is used to create a new generation of tour assignments. The new generation of schedules can then be further optimized using a formal objective function and constraints and/or it can be evaluated by one or several managers using IE. The resulting solutions are then again evaluated by the mailmen, etc., repeating in an iterative manner, until a satisfactory solution has been reached. In one embodiment, a satisfactory solution is a solution that satisfies management criteria and constraints as well as an overall satisfaction level among mailmen.

In a parallel embodiment configuration, users can collectively evaluate parallel populations and select one of the given parallel embodiments. For example, the selected design of a paper airplane may represent the embodiment that the users subjectively believe to be approximately the correct relative dimensions for a desired flight trajectory. In a next generation of parallel configurations, the selected configuration can remain unchanged, while the designs in other parallel embodiments may mutate based on the rules of the selected embodiment, and/or recombination with a random member of the current generation of embodiments. Accordingly, the determination of a "next" generation may not be based solely on evaluation against a single objective function, but rather the subjective criteria of one or many users selecting an overall fittest design. Achievement of the optimal configuration of primitives to create the desired functionality can be expedited by a selection procedure as provided herein. Further, the number of iterations/generations can be determined by the users incorporating expertise.

In some embodiments, the methods and systems disclosed herein can thus be understood to allow subjective evaluation of solutions by participants, and also, a pre-screening and an optimization of solutions based on objective criteria. Accordingly, the disclosed methods and systems can be understood to combine a formalized objective function and constraints traditionally used in optimization with un-verbalized and/or un-formulated and/or subjective criteria and constraints specific to human participants in the system. The subjective evaluation of these pre-optimized solutions by the participants is then used in a typical IEC manner to create a new generation of solutions via genetic operators (selection, elitism, mutation and crossover) that can be used as the starting point for another series of automated optimization. The automated optimization process is population-based to exploit the diversity of the starting population. The disclosed methods and systems can thus be understood to include a sequence of two-stage iterations, with the first stage being, for example, a fixed number of optimization steps followed by a second stage which is a single-step evaluation and fitness assignment by the participants. The result of the second stage is fed back into the first, etc.

Figure 1A:
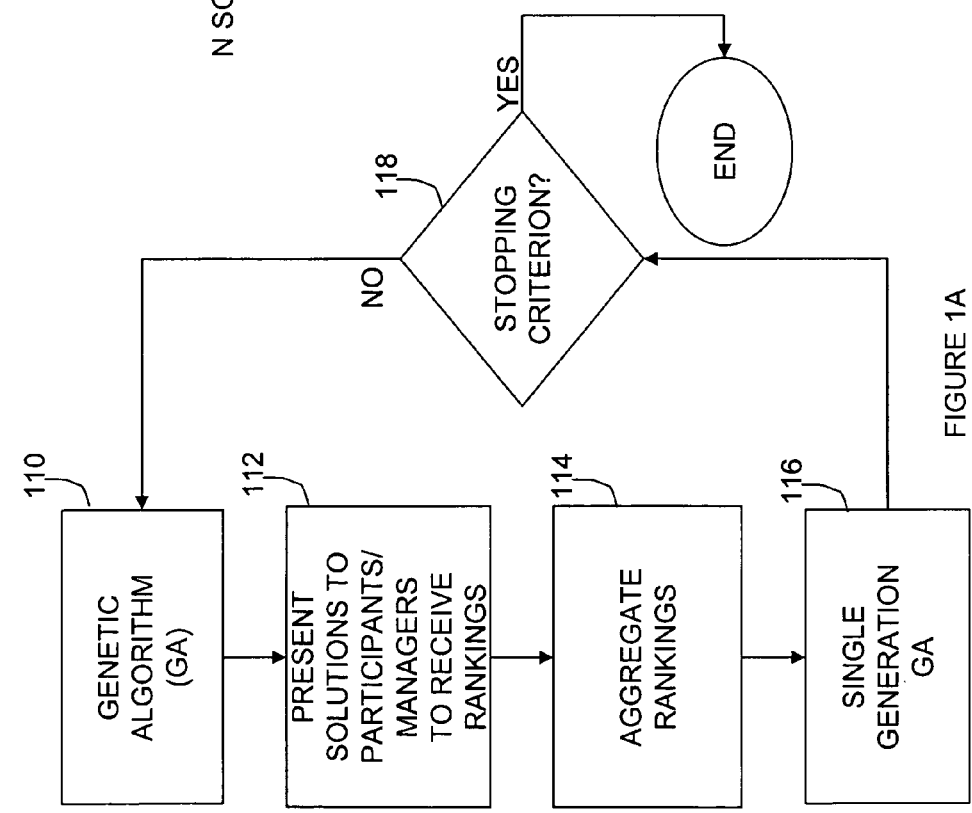

FIGS. 1A and 1B show two embodiments of the disclosed methods and systems. As show in FIGS. 1A and 1B, a "traditional" genetic algorithm 110 can be used to generate a population of N solutions. As is known in the art, the N solutions can be evaluated by an objective function and the genetic operations of selection, mutation, crossover, etc., can be used to generate a new population of N solutions. Such iterations of the GA can continue for a number of iterations that can be predetermined, and/or based on another stopping criterion(s) such as a degree of fitness. Those of ordinary skill can understand that the FIGS. 1A and 1B GA 110 can be replaced by, for example, another (e.g., non-GA) optimization scheme. In some embodiments, the optimization scheme can be executed using series and/or parallel processes (e.g., N parallel processes).

As FIGS. 1A and 1B also indicate, the N solutions provided by the GA 110 (e.g., a first solution set) can be presented, displayed, and/or otherwise provided to participants 112. As provided herein and as shown in FIG. 1B, "participants" can be categorized into classes such as "participants"/users 112A (e.g., workers) and "manager(s)" 112B. As also provided herein, some "participants" can be presented with a portion and/or subset of the solutions that are applicable to such participants. Accordingly, parts of the (first) solution set associated with a participant/user can be presented to that participant/user, while part of the (first) solution set not associated with that same participant are not presented to that participant. For example, parts of the solution set associated with a given participant 112A can be based on the participant and the participant's involvement, knowledge, etc., of such part of the solution set, while all solutions may be presented to and/or be applicable to some participants. For example, with reference to FIG. 1B, all solutions in a second solution set may be presented to a manager(s) 112B and/or other participants. As also indicated in FIGS. 1A and 1B, the participants 112, 112A, 112B can rank the solutions (e.g., parts thereof), and the solutions can be aggregated 114 before being provided to a single generation GA 116 which can employ selection, mutation, crossover, etc., to create a new generation of N solutions (e.g., the second solution set). In embodiments, rankings given by certain participants 112, 112A, 112B may have greater weight than other participants 112, 112A, 112B (e.g., workers with more experience may be given (e.g., by a manager, system administrator, other) greater weight, etc.). The output of the single generation GA 116 can be provided to the GA/optimization scheme 110 for further iterations, and/or the methods and systems of FIGS. 1A and 1B can terminated based on a stopping criterion(s) and/or a number of iterations 118. As indicated previously herein, the illustrated single generation GA 116 can also include and/or be replaced by another optimization scheme.

Figure 1C:
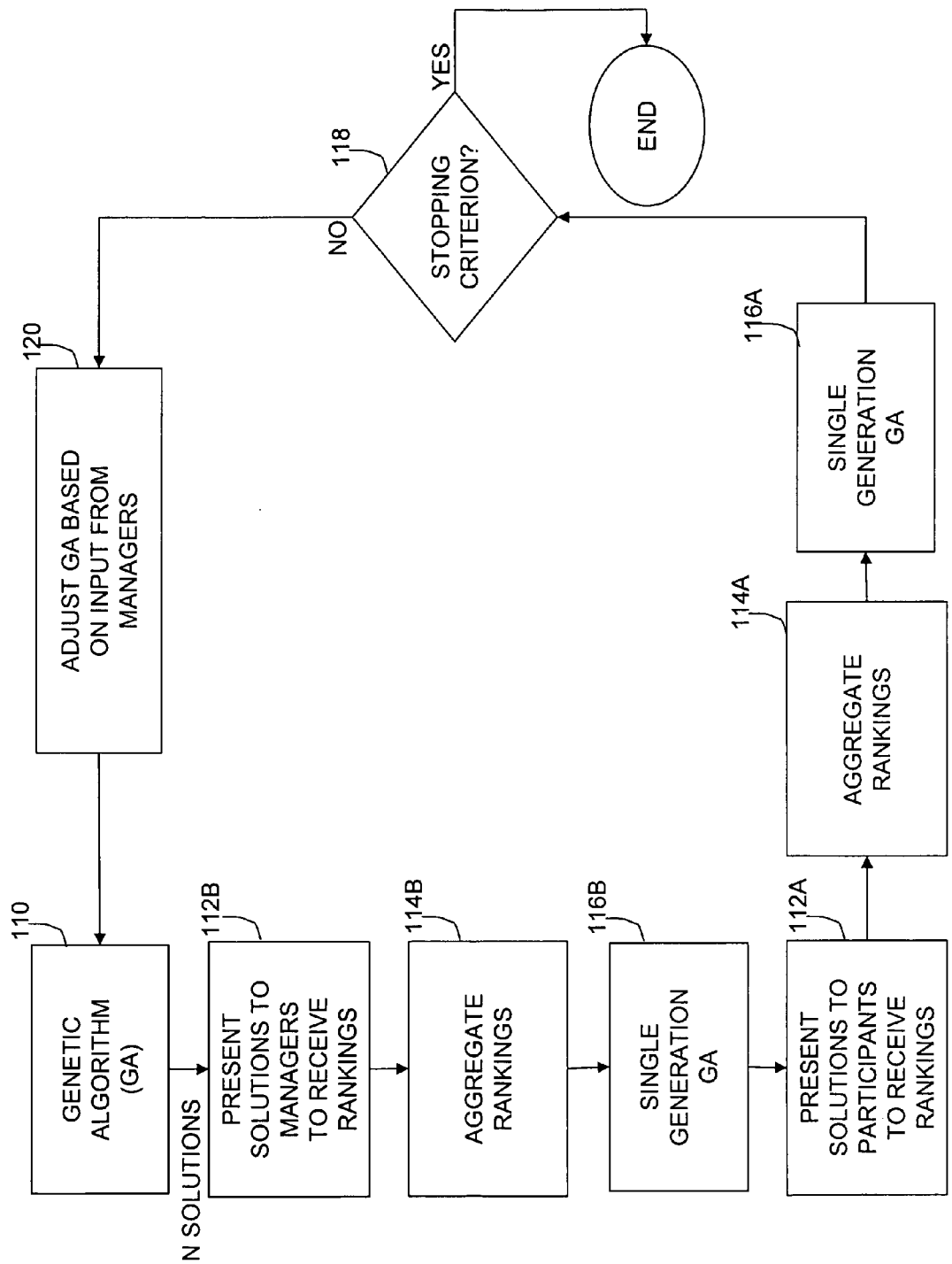

FIG. 1C provides an embodiment in which N Solutions from the GA 110 are provided to managers 112B to obtain rankings therefrom, whereupon the rankings can be aggregated 114B and provided to a single generation GA 116B before being provided to participants 112A, whereupon rankings are received therefrom, aggregated 114A, and provided to a single generation GA 116A. Also shown in FIG. 1C is an ability to obtain data from, for example, a manager(s) regarding modifications to the GA 110, where such GA modifications can be implemented 120 prior to the next iteration of the GA 110. Examples of GA modifications can include adjustments to weights on objectives in an objective function, etc.

It can be understood that many variations of the embodiments shown in FIGS. 1A-1C can be made. For example, optionally and/or in addition to the data provided by managers (e.g., rankings, changes to the GA), a manager(s) (or others) may also adjust and/or alter one or more solutions directly. For example, one modification to FIG. 1B could include a manager(s) adjusting/altering solutions to the GA 110 prior to the presentation to the participants 112A. Similarly, a modification of FIG. 1C could include a manager(s) adjusting solutions at the output of the single generation GA 116A. Such examples are merely illustrative of some variations that can include manager adjustment of solutions, and it can be understood that such adjustment can occur at various other instances in the disclosed methods and systems.

In some embodiments, an iteration of the methods and systems as shown in FIGS. 1B and 1C, for example, could include obtaining two sets of rankings from a manager(s), with a first set obtained before presentation to participants, and a second set obtained after execution of a single generation GA 116A based on rankings from the participants. Such examples of variations are intended to be for illustration and not limitation.

In yet further variations of the illustrative embodiments of FIGS. 1A-1C, a multi-tiered hierarchy of participants/users (e.g., groupings of users/participants) can be presented solutions and allowed to rank such solutions, etc. Accordingly, with particular respect to FIGS. 1B-1C, certain "participants" may include middle-level managers that may rank solutions after receiving/obtaining rankings (and the output of the single generation GA) from the participants, where such rankings from middle level managers can be aggregated and provided to a single generation GA before being presented/provided to upper-level managers for ranking, etc. In yet a further variation, at various processing points in the disclosed methods and systems of such an embodiment, upper level managers may be allowed to adjust the solutions directly before presenting solutions to the participants and/or middle-level managers. In some embodiments having multiple groupings of user that may include a hierarchical and/or multiple-tiered system, given groupings of users may have the ability to directly adjust solutions (e.g., prior to obtaining rankings) for all levels of user groupings in the hierarchy which may be hierarchically "below" such given groupings. Such hierarchical assignment of rights/privilege to directly adjust solutions before presentation to a group is merely one example methodology for assigning such rights/privileges, and the methods and systems are not limited to such assignment methods. It can thus be understood that other embodiments of the disclosed methods and systems may associate solution-modification rights to users (individually and/or as groups) in various manners. Accordingly, all users/participants in a group may not necessarily have the ability to adjust solutions directly (and/or to adjust the parameters of the GA 110), and it can also be understood that the rights/privileges to directly adjust solutions can optionally and/or additionally be extended to rights/privileges to adjust the GA 110 and/or to alter/set the weightings assigned to the rankings of participants (e.g., some individual users and/or groups of users may adjust solutions directly, and/or some individual users and/or groups of users may be able to adjust the GA parameters, and/or some individual users and/or groups of user may be able to assign/set weightings to certain users such to affect the weight of such users' rankings).

Considering in further detail the mailman example provided herein, in such an embodiment, each mailman can be assigned a region. In the example embodiment, an heuristic algorithm can be used to create random shapes that are the borders of an arbitrary region. For example, k numbers $\rho_1, \ldots, \rho_k$ are drawn independently from a normal distribution $N(0, 1)$ of mean 0 and variance 1. The numbers are then rescaled according to: $\rho_i \leftarrow \rho_i - \min\{\rho_j\} + 1$ followed by $\rho_i \leftarrow \rho_i / \max\{\rho_j\}$, so all numbers are between zero and one. The borders of the random region are the points represented by complex numbers $\rho_i \exp(2i\pi/k)$, $i=1$ to $k$.

The region can then be divided into m sub-regions using a recursive cut algorithm, where m is the number of mailmen. Let A be an area divided into s non-overlapping regions: $A = A_1 \cup \ldots \cup A_s$. The largest region (largest area) $A_j$ is identified and divided into two regions A' and A":

$A = A_1 \cup \ldots \cup A_{j-1} \cup A' \cup A'' \cup A_{j+1} \cup \ldots \cup A_s$.

This process is repeated until m regions are created.

Figure 2:
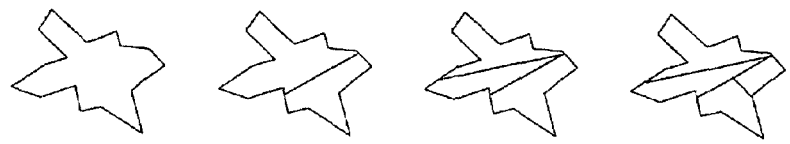
FIG. 2 shows an illustration for one embodiment showing a sequence of three recursive cuts.

In subdividing a region into two regions, it can be desirable to create a random cut close to the center c of the region. Letting r be the radius of the region, defined as the distance from c to the nearest point on the region's border, then $c_1 = c + r\rho \exp(2i\pi\tau)$ and $c_2 = c_1 \exp(2\pi\phi)$, where $\rho$, $\tau$ and $\phi$ represent independent random variables drawn according to a normal distribution $N(0, 1)$ of mean 0 and variance 1. The region can be divided into two sub-regions along the line defined by the two points $c_1$ and $c_2$. $\rho$ represents the distance from $c_1$ to the center with r being the distance unit, $2\pi\tau$ is the angle away from the center, and $2\pi\phi$ is the inclination of the dividing line. FIG. 2 shows a sequence of 3 recursive cuts subdividing the area into four regions. Note that this generative procedure does not guarantee area balancing. The search engine thus discovers solutions that correspond to a fair partition of space.

Figure 3:
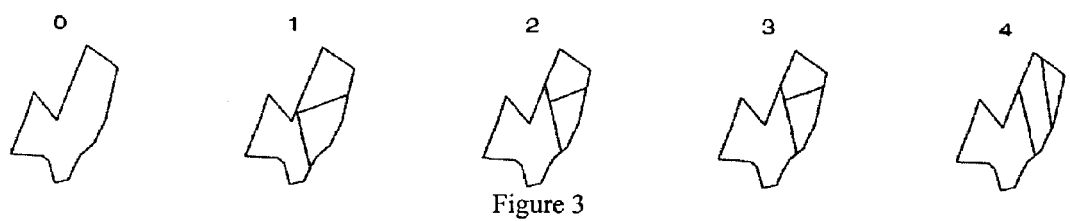
FIG. 3 shows the effect of mutation, illustrating a random area (0), a heuristic random partition obtained from the recursive cut techniques (1), and successive mutations (2)-(4)

Given that the number of mailmen is constant, subdivisions should be mutated without altering the number of subdivisions. Mutation can also be achieved using the recursive cut technique described herein. For example, the area can be divided into m regions as provided previously herein. The resulting genotype is a sequence of m chromosomes, each chromosome being of the form $(j_i, \rho_i, \tau_i, \phi_i)$, where $j_i$ is the largest region, to be further subdivided, at s the recursive cut process, and the other parameters correspond to $\rho$, $\tau$ and $\phi$, and define a split into two sub-regions. It can be understood that the m chromosomes do not directly represent the m regions, but rather represent the m successive steps of the recursive cut process. To mutate this particular layout of the regions, a number i between 1 and m is selected and a uniform random noise U(−0.1,+0.1) is applied to all three parameters $\rho_i$, $\tau_i$, $\phi_i$. FIG. 3 shows the effect of mutations on a partition.

Figure 4:
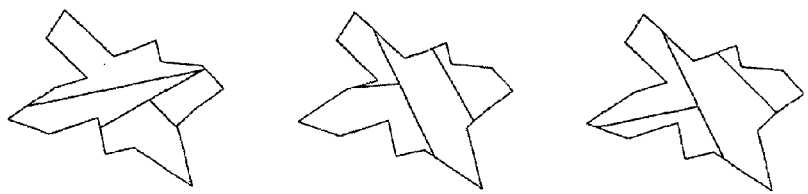
FIG. 4 illustrates a partition X, a partition Y, and an example crossover partition Z.

In this example embodiment, a crossover mechanism can be used to recombine two subdivisions. Considering two subdivisions X and Y, where X can be represented as a set of (m−1) 4-tuples $X_i=(j_i, \rho_i, \tau_i, \phi_i)$, i=1 to m−1, where m is the number of mail represented as a set of (m−1) 4-tuples $Y_i$, i=1 to m−1. A uniformly random single-point crossover between two partitions X and Y is defined by a random number k drawn from a uniform distribution over $\{2, \ldots, m-1\}$ and produces a partition Z given by: $Z_i=X_i$ if i<k and $Z_i$'FIG. 4 shows an example of a crossover.

The m mailmen can be represented by a set of characteristics. Some characteristics can be deemed "public" in that they are known, for example, to management and can be considered in a traditional objective function; however, some are "private" and are known, sometimes only implicitly, to each mailman. Some characteristics include years of experience, speed of delivery, preferences and efficiencies that vary with location for a given mailman, etc. Location-dependent variables can be understood to be "preferences," which are private, and "efficiency," which is public. These variables are assumed to be constant over most of the area to reflect the fact that most locations are probably neutral from the viewpoints of preferences and efficiency for a given mailman. The neutral base level is assumed in this embodiment to be zero. In addition, certain locations are assigned a preference weight $w_p$ and/or an efficiency weight $w_e$. Both $w_p$ and $w_e$ are drawn from a uniform distribution U[−1,+1].

For each mailman, ten locations are randomly generated from a uniform distribution over [−1,+1]×[−1,+1]. Locations outside of the region are not considered, while locations that do within the region are assigned a weight that can be an efficiency weight or a preference weight. In the illustrated embodiment, a negative weight indicates a mailman is either inefficient at and/or unhappy with that location, while a positive weight is indicates a mailman is either efficient at and/or happy with that location.

In the illustrated embodiment, mail volume is uniform across locations, but the methods and systems are not limited to such assumption.

For the disclosed embodiment, a set of partitions is generated, an optimization heuristic is executed for a fixed number of iterations T to increase the objective efficiency of solutions, the best solutions from the optimization run are selected for presentation to the participants who rank only the portions of solutions they have been assigned, selection and evolutionary operators are applied to the participant-evaluated solutions on the basis of the participants' subjective ranking, the resulting solution set is provided to the optimization heuristic which is run again for T iterations to improve efficiency, etc. In this process, there is therefore a sequence of two-stage iterations, the first stage being T optimization iterations, and the second stage being one evolutionary iteration driven by a subjective fitness evaluation.

For the illustrated embodiment, the optimization heuristic included a deterministic crowding algorithm with a population of h (e.g., h=6) parallel hill climbers evolved for N (e.g., N=100) generations. Each solution (partition) in the population is mutated, the mutated solution is evaluated, and the parent is replaced if the mutation is better than the parent. The population is unmixed to preserve diversity.

The efficiency score of a partition is determined by, for every mailman, determining a maximum score $MAX_e$ and a minimum score $MIN_e$. $MAX_e$ is obtained by accumulating (e.g., sum) positive $w_e$, while $MIN_e$ is obtained by summing negative we. A given region A can then be assigned a normalized efficiency score $S_e$ between −1 (very bad) and +1 (very good): $S_e=2((\Sigma_{x \in A} w_e(x)/(MAX_e-MIN_e))-0.5)$. To consider the surface area a of A, an efficienc function $C_e$ is calculated: $C_e=a.\lambda^{S_e}$, where $\lambda=0.9$. According to this scoring formula, it is better (lower cost) to assign a mailman to an area where they score positive points (up to 10% improvement). This model assumes that efficiency weights modulate the importance of the size of the area assigned to a mailman. If $C_e(i, A)$, i=1 to m, A=1 to m, is the efficiency cost of mailman i being assigned region A, for each permutation a which assigns a region $\sigma$ (i) to each mailman i, the total efficiency cost of $\sigma$ is given by: $C_e(\sigma)=\Sigma_{i=1}^{m} C_e(i,\sigma(i))$. The best region allocation from the point of view of efficiency is $\hat{\sigma}=\text{ArgMax}(C_e(\sigma))$.

Of further consideration is area balancing to ensure a fair allocation with limited size variance across the allocated regions. Regulations and limits to the number of work hours require the integration of area balancing (more generally workload balancing, since in the real world workload is affected by a multiplicity of factors such as mail volume, geographic conditions, distance walked or driven, etc). To reduce the cost variance (rather than size variance, which does not take into account mailman efficiency) $v(\sigma)=\Sigma_{i=1}^{m}[C_e(i,\sigma(i))-\overline{C}_\sigma]^2$, efficiency cost of a mailman for allocation $\sigma$, $C_e(\sigma)$ is modified as follows: $C_e(\sigma) \leftarrow C_e(\sigma)\psi^{v(\sigma)}$ where $\psi=1.3$. Accordingly, $C_e(\sigma)$ is amplified if region allocation $\sigma$ is uneven. $C_e$ is the cost function used to evaluate solutions in the parallel hill climbers. A solution is better if its $C_e$ is lower.

The n (e.g., n=6) best solutions from the optimization executed with the objective function $C_e$ can be now presented to the mailmen, who assign a dissatisfaction number to the different solutions based solely on the regions they have been assigned (e.g., a mailman may have no knowledge of regions assigned to other mailmen, and/or may make use of that knowledge in rating their own regions). In one embodiment, each mailman is assigned one region in each of the six partitions. A solution is a partition $P=A_1, \ldots, A_m$ of space into m regions and an assignment $\sigma$ of mailmen to the regions. For every mailman, there is a maximum preference score $MAX_p$ and a minimum preference score $MIN_p$. $MAX_p$ is obtained by summing all positive preference weights $w_p$, while $MIN_p$ is obtained by summing all negative $w_p$. Any given region A can then be assigned a normalized preference score $S_p$ between −1 (very bad) and +1 (very good): $S=2((\Sigma_{x \in A} w_p(x)/(MAX_p-MIN_p))-0.5)$. To consider the surface preference cost function $C_e$ (or dissatisfaction) can be calculated: $C_e=a.\lambda^{s_e}$, where $\lambda=0.9$. Each mailman can therefore compute a personal dissatisfaction for each of the n regions proposed to the mailman. Based on $C_e$, each mailman can rank the n solutions. If R(i,k) is mailman i's ranking of solution k, the cost $C_p(k)$ of solution k is the sum of the cubed rankings: $C_p(k)=\Sigma_{i=1}^{m} R^3(i,k)$. The cubic exponent is intended to "punish" solutions that give a mailman a high preference cost, thereby implicitly favoring preference balancing.

Based on the calculation of $C_p$, a new population of n=6 solutions is created/generated using the following scheme:

(1) the best solution remains unchanged; (2) a mating pool comprised of the best three solutions is built; (3) two new solutions are created by applying the crossover operator described herein to randomly selected partitions in the mating pool and finding the best permutation (lowest dissatisfaction); (4) two new solutions are created by applying the mutation operator described herein to randomly selected partitions in the mating pool and finding the best permutation (lowest dissatisfaction); (5) one new solution is generated randomly.

Figure 5A:
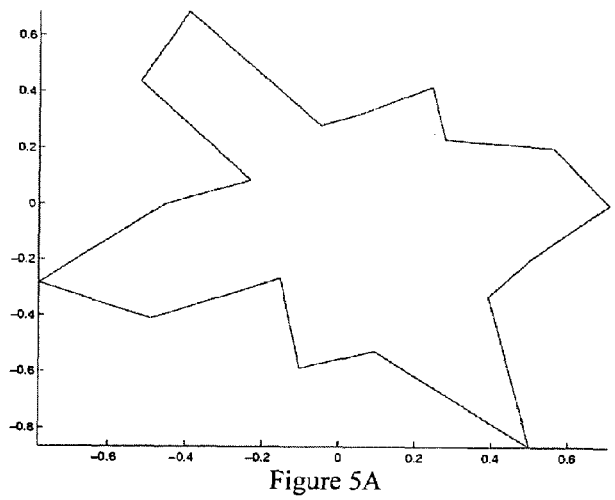
FIGS. 5A and 5B illustrate indicates the preference (circles) and efficiency (diamonds) locations and weights for a mailman routing embodiment.
Figure 5B:
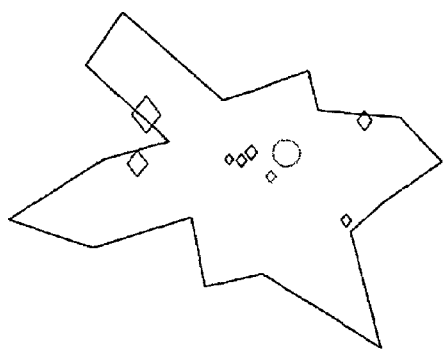
Figure 5B:
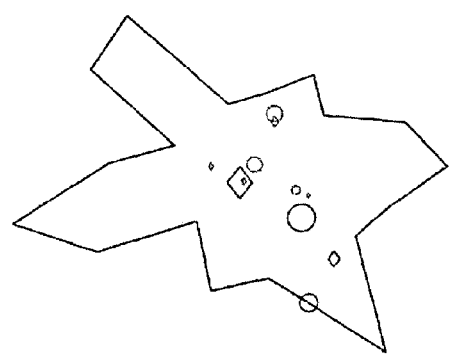
Figure 5B:
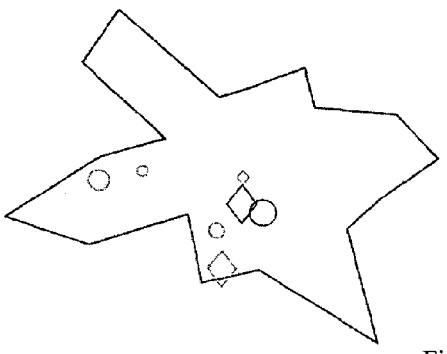
Figure 5B:
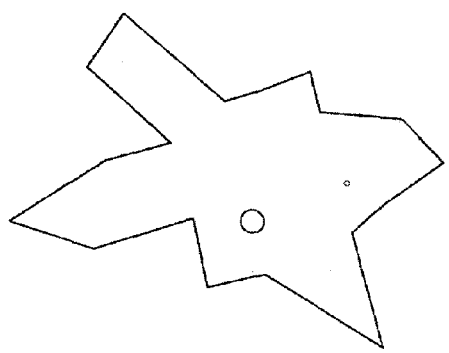

In an example using four mailmen, a region is generated as provided herein (e.g. FIG. 5A), and positive and negative preference and efficiency locations are assigned to each mailman. FIG. 5B indicates the preference (circles) and efficiency (diamonds) locations and weights for each mailman. In the illustrated embodiment, dark circles or diamonds correspond to negative values, while light circles or diamonds correspond to positive values. The size of the symbol (e.g., diamond, circle) is proportional to the absolute value of preference of efficiency weight.

Figure 6A:
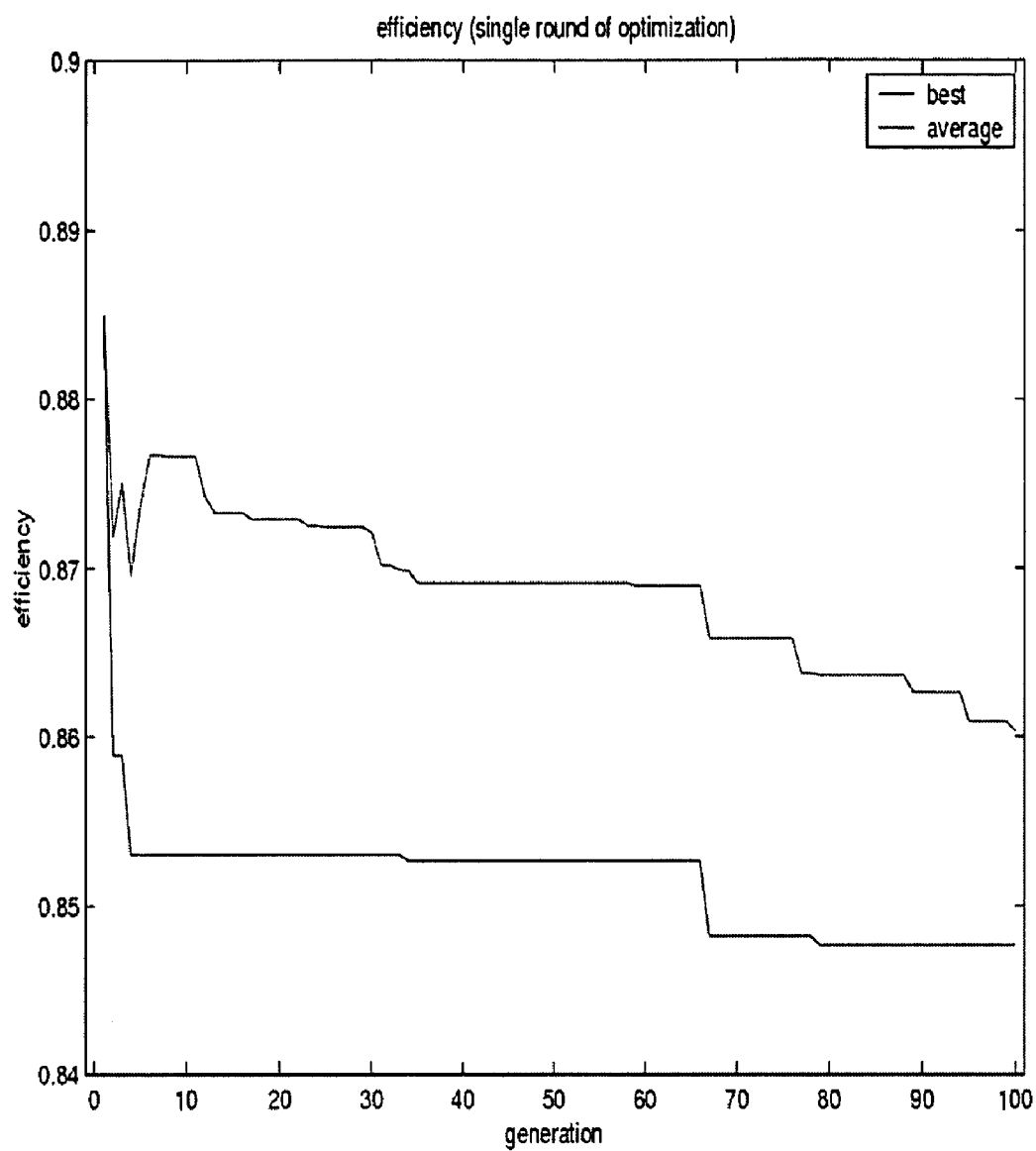
FIGS. 6A and 6B show
Figure 6B:
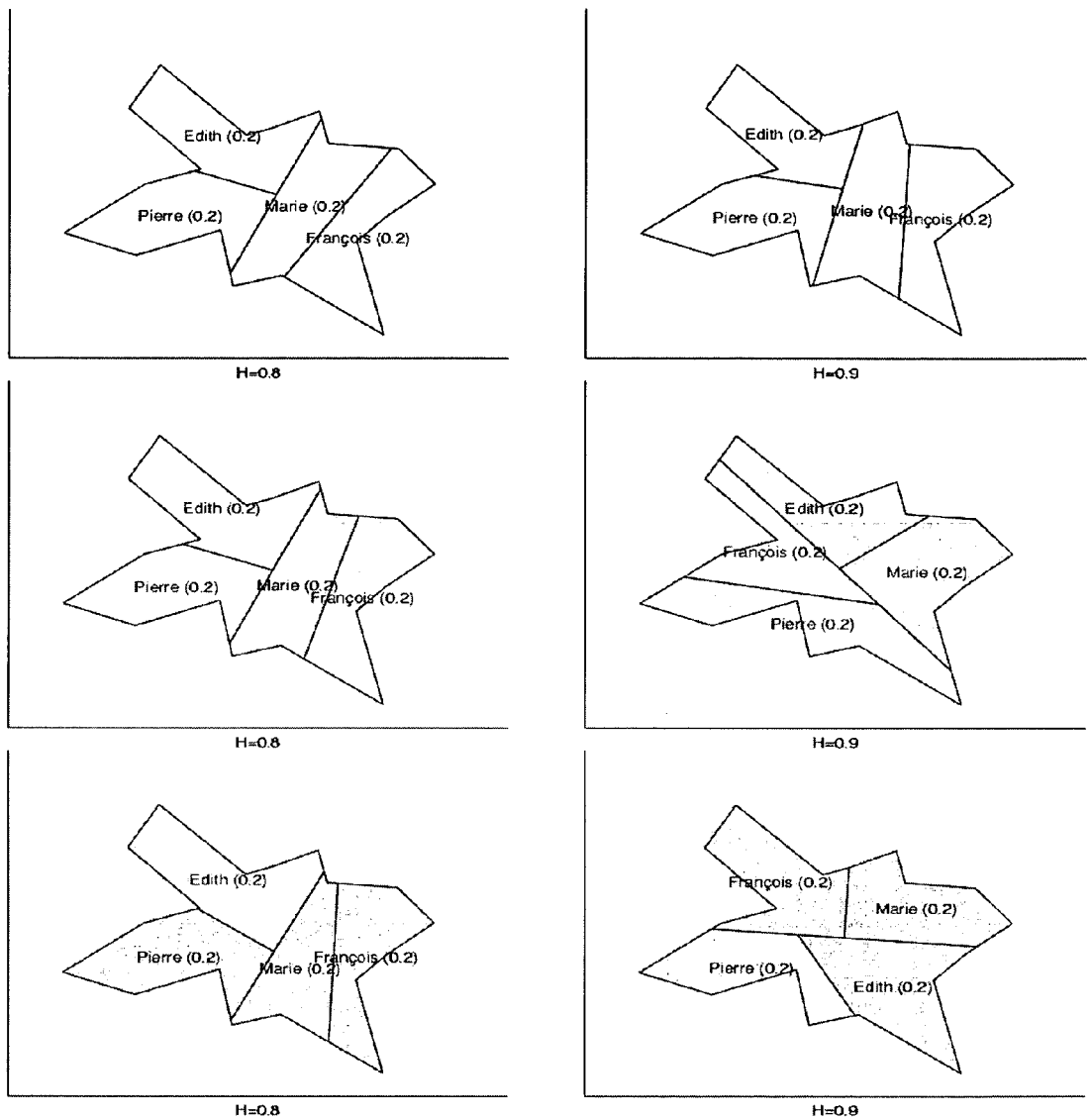
Figure 7:
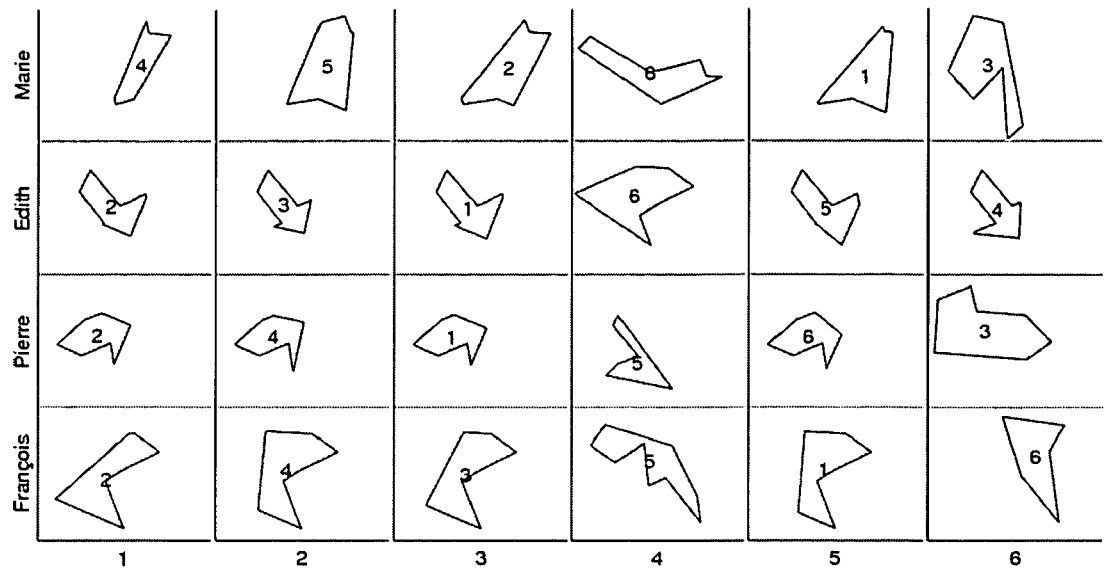
FIG. 7 illustrates one presentation of solutions to the mailmen and each mailman's ranking.

FIG. 6A shows an average and best fitness during an optimization execution for an optimization heuristic executed for T=100 iterations. In FIG. 6A, fitness is a cost function to be minimized. FIG. 6B shows the six best partitions from the optimization together with their best corresponding allocations. The six best solutions are then presented to the mailmen in the form of the regions they have been assigned. Each mailman ranks each region presented to the mailman, where FIG. 7 illustrates one presentation of solutions to the mailmen and each mailman's ranking (recall that mailmen get solutions only for the portion in which the mailman is a participant). A new population is generated based on the mailmen's ranking.

Figure 8A:
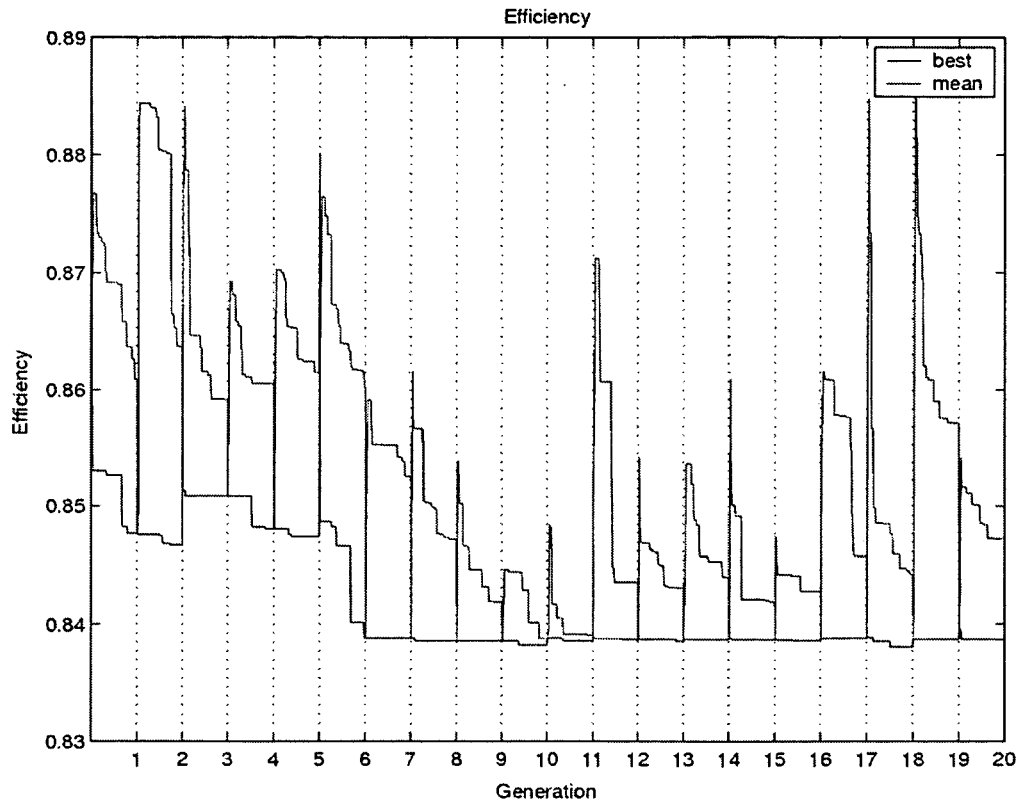
FIGS. 8A and 8B show fitness plots for efficiency and preferences.
Figure 8B:
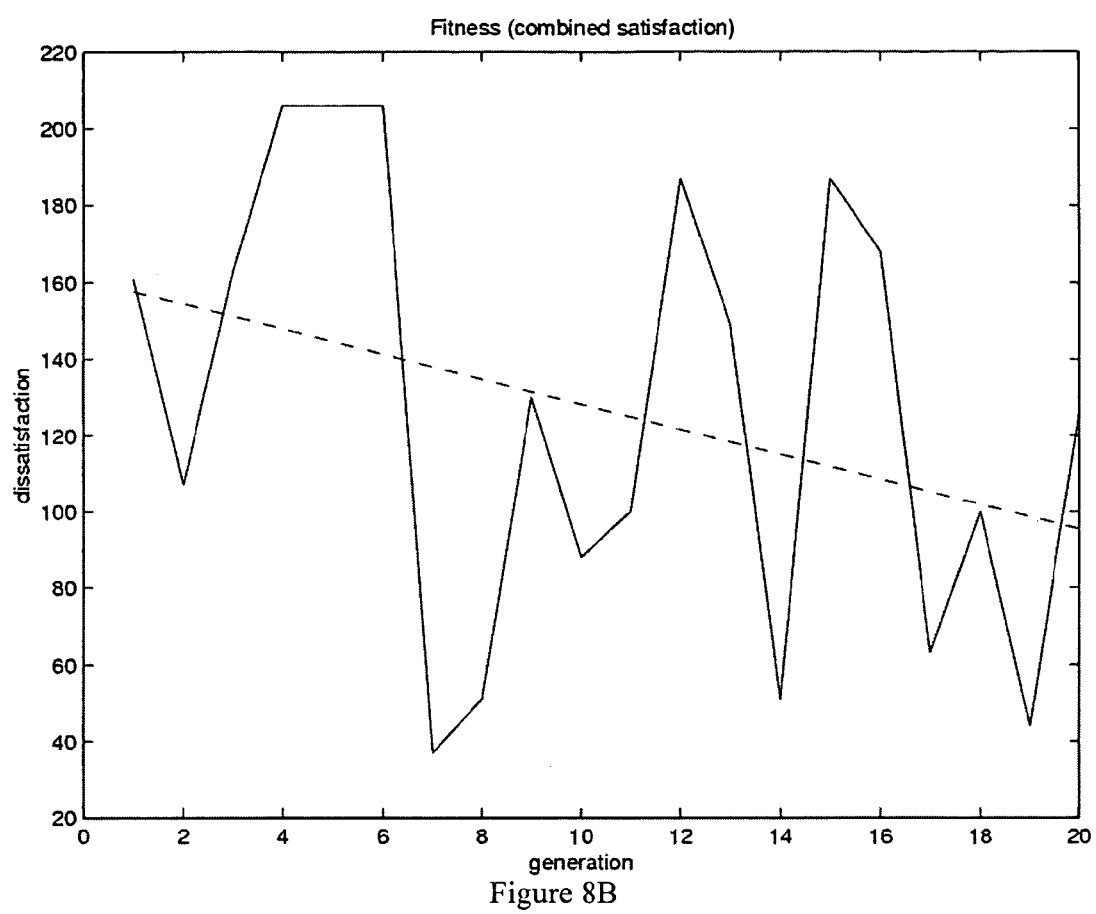
Figure 9A:
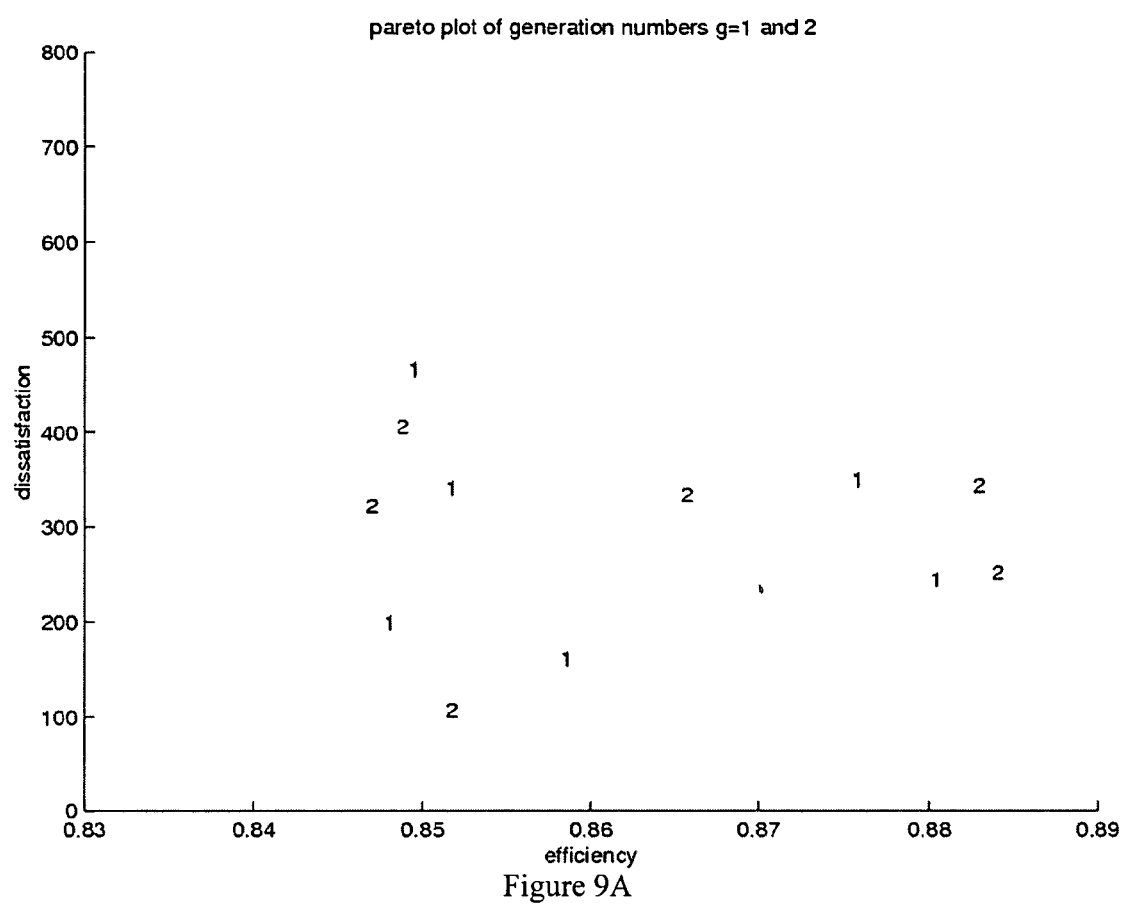
FIGS. 9A and 9B indicate dissatisfaction versus efficiency cost at the end of iterations 1 and 2 (six solutions per iteration), and 19.
Figure 9B:
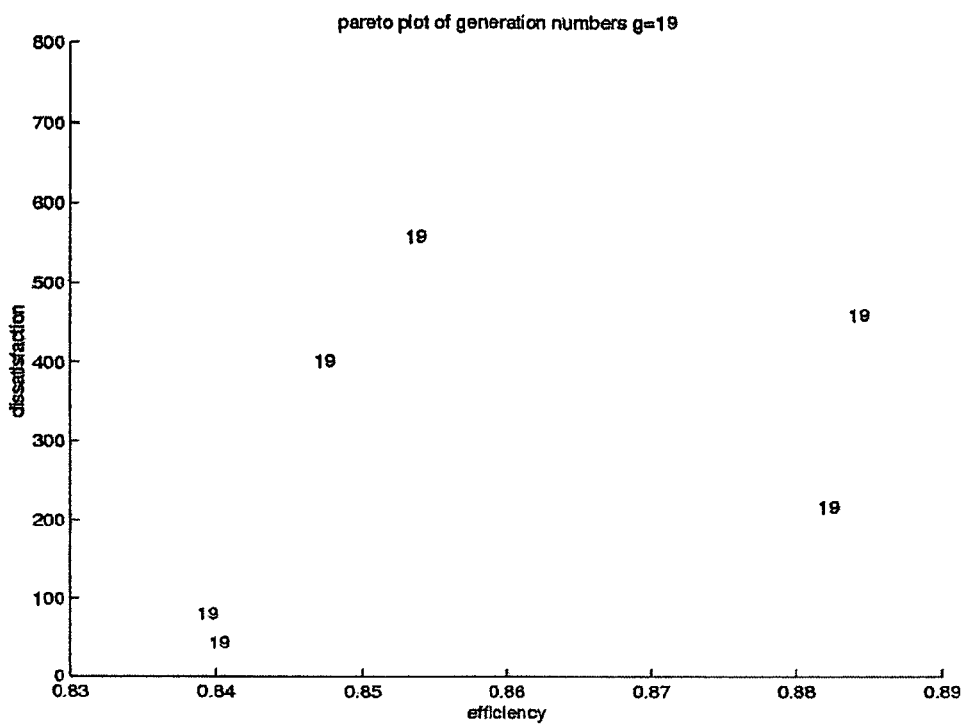
Figure 10:
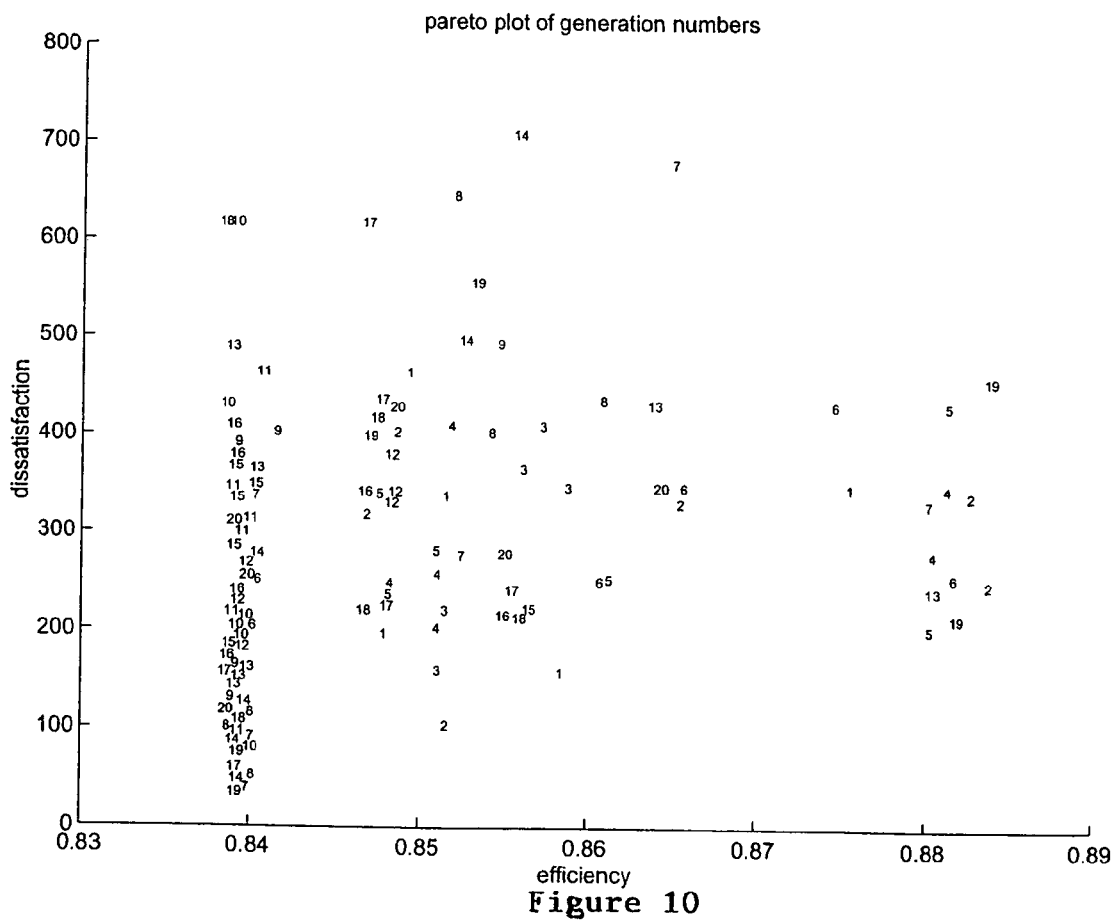
FIG. 10 illustrates a dissatisfaction versus efficiency plot for multiple iterations.

This process is iterated until satisfactory solutions are discovered. FIGS. 8A and 8B show fitness plots for efficiency and preferences, respectively, (both fitness functions are cost functions to be minimized) for 20 iterations of the two-stage process (efficiency optimization+preference evaluation), and both plots show a decreasing trend; however, with a multi-objective optimization problem, observing single-objective plots provides limited information. Accordingly, FIG. 9A shows dissatisfaction versus efficiency cost at the end of iterations 1 and 2 (six solutions per iteration), while FIG. 9B shows the same at the end of iteration 19. The best solutions, which minimize both efficiency cost and preference cost, are located in the lower left corners of FIG. 9A-9B. Although there are still bad solutions at iteration 19 due to the injection of random solutions, the best multi-objective solutions are significant improvements over those of iterations 1 and 2. FIG. 10, which shows dissatisfaction versus efficiency cost for all iterations, indicates that the best solution occurred at the end of iteration 7, indicating that the process converges fast despite its multi-objective nature.

What has thus been described are methods, systems, and processor program products that include executing an optimization scheme to obtain a first solution set, presenting the first solution set to at least two users, receiving rankings of the first solution set from the at least two users, aggregating the rankings, and, generating a second solution set based on the aggregated rankings. The optimization scheme can include a genetic algorithm. In embodiments, at least a part of the first solution set can be presented to the users based on the parts of the solution set associated with the user (e.g., user's knowledge).

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. For example, although the methods and systems indicated that a single generation genetic algorithm can be used, another optimization scheme, including a multiple generation genetic algorithm, can be used. In some embodiments where multiple groups of users may be presented with solutions, at least some of the users may be in multiple groups and thus may provide rankings/fitness values for different solution sets.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. A computer-readable medium having computer-readable instructions stored thereon which when executed in a computer system having at least one user interface including at lest one output device and at least one input device, instruct the computer system to perform a method, comprising:

a) causing at least a part of a solution set to be presented through at least one of the at least one output devices to at least two first-level users,
   b) receiving through at least one of the at least one input devices, from at least one of the at least two first-level users, a ranking of the at least a part of the solution set presented to that user,
   c) if rankings of at least a part of the solution set were received from a plurality of first-level users, aggregating the rankings and generating an updated solution set based on the aggregated rankings,
   d) if rankings of at least a part the solution set were received from only one first-level user, generating an updated solution set based on the ranking by the said user,
   e) causing the updated solution set to be presented through at least one of the at least one output devices to at least one second-level user,
   f) receiving through at least one of the at least one input devices, from at least one of the at least one second-level users, a ranking of the updated solution set,
   g) if rankings of the updated solution set were received from a plurality of second-level users, aggregating the rankings, and generating a further updated solution set based on the aggregated rankings,
   h) if rankings of the updated solution set were received from only one second-level user, generating a further updated solution set based on the ranking by the said user,
   i) determining if a stopping criterion has been satisfied,
   j) if the said stopping criterion has not been satisfied, repeating steps a) through i) based upon the further updated solution set, and
   k) if the said stopping criterion has been satisfied, causing at least a portion of the further updated solution set to be presented to at least one user through at least one of the at least one output devices.

2. A computer-readable medium according to claim 1, where generating an updated solution set includes generating the updated solution set using an optimization scheme.

3. A computer-readable medium according to claim 2, where the optimization scheme comprises a genetic algorithm.

4. A computer-readable medium according to claim 3, where the genetic algorithm is a single generation genetic algorithm.

5. A computer-readable medium according to claim 3, where the genetic algorithm is a multiple generation genetic algorithm.

6. A computer-readable medium according to claim 1, where causing at least a part of a solution set to be presented through at least one of the at least one output devices includes: determining, for each first-level user, which at least a part of the solution set is associated with the said user, and, causing to be presented to each user through at least one of the at least one output devices the at least a part of the first solution set associated with the said user.

7. A computer-readable medium according to claim 6, where determining which at least a part of the solution set is associated with the said user includes determining based on at least one of a knowledge of the said user, an involvement of the said user, and an experience level of the said user.

8. A computer-readable medium according to claim 1, where causing at least a part of a solution set to be presented through at least one of the at least one output devices includes causing to be presented at least one of: in parallel and in series.

9. A computer-readable medium according to claim 1, where receiving rankings through at least one of the at least one input devices includes receiving rankings within a time period.

10. A computer-readable medium according to claim 9, where receiving rankings within a time period includes: determining that a time period expired, and, assigning a ranking based on a prior ranking received from a user.

11. A computer-readable medium according to claim 9, where receiving rankings within a time period includes: determining that a time period expired, and, assigning a ranking based on a default ranking.

12. A computer-readable medium according to claim 1, where aggregating the rankings includes aggregating based on weightings assigned to the plurality of users from whom the rankings were received.

13. A computer-readable medium according to claim 2, further comprising determining whether at least one exit criterion is satisfied before ceasing to execute the optimization scheme.

14. A computer-readable medium according to claim 2, further comprising adjusting at least a part of the optimization scheme based upon input from at least one second-level user.

15. A computer-readable medium according to claim 14, where adjusting at least part of the optimization scheme includes modifying parameters of the optimization scheme.

16. A computer-readable medium according to claim 15, where modifying parameters of the optimization scheme includes modifying parameters of a genetic algorithm.

* * * * *